United States Patent [19]
Schutzbach et al.

[11] Patent Number: 5,285,030
[45] Date of Patent: Feb. 8, 1994

[54] SWITCH MODULE

[75] Inventors: Bernd Schutzbach, Tuttlingen; Bernd Hugger, Villingen-Schwenningen, both of Fed. Rep. of Germany

[73] Assignee: Marquardt GmbH, Rietheim-Weilheim, Fed. Rep. of Germany

[21] Appl. No.: 793,568

[22] Filed: Nov. 18, 1991

[30]     Foreign Application Priority Data

Nov. 24, 1990 [DE] Fed. Rep. of Germany ....... 4037454

[51] Int. Cl.$^5$ .............................................. H01H 9/02
[52] U.S. Cl. ..................................... 200/1 A; 200/307
[58] Field of Search ................... 200/1 A, 1 TK, 6 R, 200/6 C, DIG. 46, 245–247, 283, 307

[56]                    References Cited
              U.S. PATENT DOCUMENTS

| 3,176,109 | 3/1965 | Wodtke | 200/1 R X |
| 3,790,733 | 2/1974 | Pohl | 200/283 |
| 3,900,712 | 8/1975 | Fukao | 200/307 |
| 4,168,404 | 9/1979 | Lockard | 200/1 R |
| 4,431,876 | 2/1984 | Labude et al. | 200/5 R |

FOREIGN PATENT DOCUMENTS

| 1849281 | 4/1962 | Fed. Rep. of Germany . |
| 1147290 | 4/1963 | Fed. Rep. of Germany . |
| 1640305 | 6/1971 | Fed. Rep. of Germany . |
| 7015225 | 8/1973 | Fed. Rep. of Germany . |
| 2918640 | 11/1979 | Fed. Rep. of Germany . |
| 3426949 | 1/1986 | Fed. Rep. of Germany . |
| 8801539 | 5/1988 | Fed. Rep. of Germany . |
| 2396401 | 1/1979 | France . |

*Primary Examiner*—J. R. Scott
*Attorney, Agent, or Firm*—Spencer, Frank & Schneider

[57]                    ABSTRACT

A switch module includes a plurality of individual switches (2), each having a base (3), which are arranged next to one another in a common holder on the same plane. The bases (3) are embedded in a common base (4) produced by encapsulating in a plastic. The bases (3) can be fixed to one another before encapsulating by means of plug-in connecting parts. The common base (4) has fastening claws (5) arranged on both sides, the talon ends of which are designed as enlargements (6). The sealing surface (17) has no mold-parting flash.

7 Claims, 2 Drawing Sheets

SWITCH MODULE

BACKGROUND OF THE INVENTION

The invention relates to a switch module comprising a plurality of individual switches, each having a base, which are arranged next to one another in a common holder on the same plane.

Switch modules comprising leaf switches which are accommodated in multiple combination together in a common housing are known. This housing serves as intermediate housing for holding the individual switches. It also effects a certain alignment of the same.

If all the switches are activated by a common actuator, it is of particular significance for an exact manner of operating that the individual switching contacts are aligned to the same contact plane, in order that they can be operated simultaneously by a common actuator. The necessary high switching accuracy cannot be accomplished with the existing modules of pluggable switches and a separate housing on account of the tolerances occurring between the individual switch bases and the housing wall. Apart from the existing positional inaccuracy, a further disadvantage is that the switch with the intermediate housing represents a large accumulation of material.

On the other hand, it is virtually impossible to provide a plurality of leaf switches, which each comprise a plurality of leaf springs, with a common base in one molding operation. It is not possible to set so many individual parts exactly in a plastics injection mold.

SUMMARY OF THE INVENTION

The invention is based on the object of providing a switch module comprising a plurality of individual switches which guarantees a high positional accuracy of the individual switches and manages with a small amount of material.

This is achieved by the invention, according to which, briefly stated, the switch module includes a plurality of electric switches each having a switch base; an interengaging mechanism mounted on each switch base for coupling together adjoining switches in a side-by-side relationship in a single plane; and switching contacts secured to the switch base. There is further provided a common module base receiving the switch bases in the side-by-side relationship. The module base is an injection-molded plastic component embedding and immobilizing therein the switch bases for forming an inseparable bond between the switch bases. First of all, individual switches identical to one another with plastic bases are produced. These individual bases are designed in such a way that, by fitting into a further common injection mold and by additional mutual plug-in connections, a satisfactory positional fixing of the switches with respect to one another is possible. The individual base has on one side a spring-like tongue and on the other side a groove designed according to the dimension of the tongue. As lateral limitations for accurate arresting of the tongue, the groove has on each side a ridge which terminates the groove. The tongue of the one base can be inserted into the groove of the other base. The individual switches thus fixed to each other can be extended at will to form a two-part, three-part or multi-part switch unit. The joined-together switch unit is then unified by a further plastics injection-molding process to form a common module, i.e. the bases are combined by encapsulation.

By the injection mold, at the same time fastening or mounting means are molded onto the common base. These fastening means are preferably claw-shaped and have an enlargement at each of the free talon ends. The fastening means serve to hold the switch module firmly in prefabricated equipment openings in such a way that a maximum positional assimilation is achieved in relation to the actuator.

For intimate and inseparable bonding of the individual bases to form an overall base, the individual bases are provided with break-throughs, into which the forced-in plastics compound penetrates. A homogeneous common base is achieved in particular by the plastics compound of the individual bases being the same or at least of the same type as the plastics compound used for encapsulation.

A further important proposal is to design the parting of the preferably two-part injection mold in such a way that the movable mold part moves in the longitudinal direction of the leaf springs making up the switch or switches. The mold parting is consequently turned by 90° in relation to the mold parting of the individual mold. This has the advantage that the common base is given a sealing surface without flash and completely level, with the aid of which the switch module can be satisfactorily fitted in a sealing manner against an equipment housing or the like with a corresponding sealing element interposed. In the central region of the common base, the mutual plug-in connections of the individual bases are likewise impervious, since plastics compound can penetrate into any gaps between the plug-in connecting parts.

The invention also comprises the production process of the switch modules. It consists in that first of all the functional individual switches are produced separately by embedding the contact parts in each case into a base of plastic and that then a plurality of these individual switches are combined by encapsulating their bases in plastic to form a common base.

The high production accuracy of the individual switches, which are already fully functional before encapsulation, proves to be a major advantage of the invention. In addition, the individual switches are exactly positioned within the switch module, i.e. they have a common contact plane. A high switching accuracy follows from this. It is also advantageous that the space requirement of such a switch module is very reduced in comparison with existing solutions.

BRIEF DESCRIPTION OF THE DRAWINGS

The invention is to be explained in more detail below with reference to an illustrative embodiment. In the associated drawing.

DESCRIPTION OF THE PREFERRED EMBODIMENT

Figure 1:
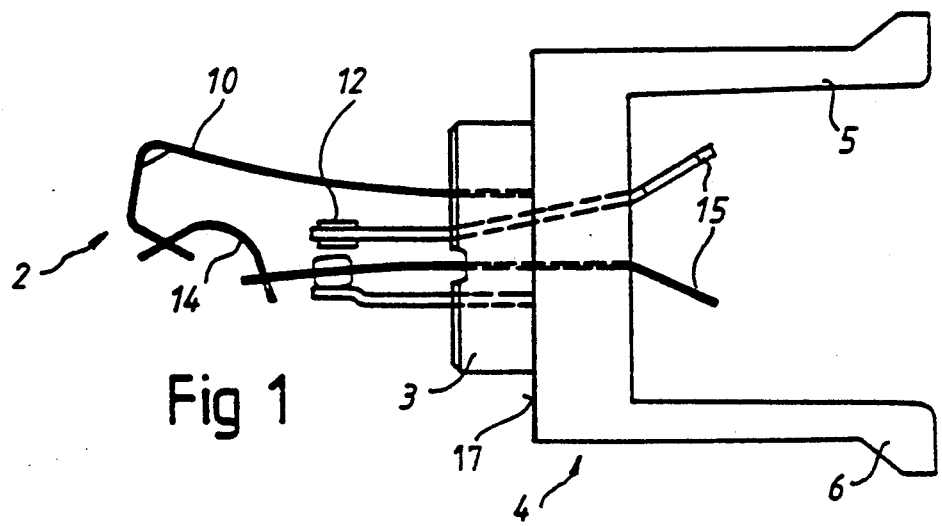
FIG. 1 shows a side view of the switch module.
Figure 2:
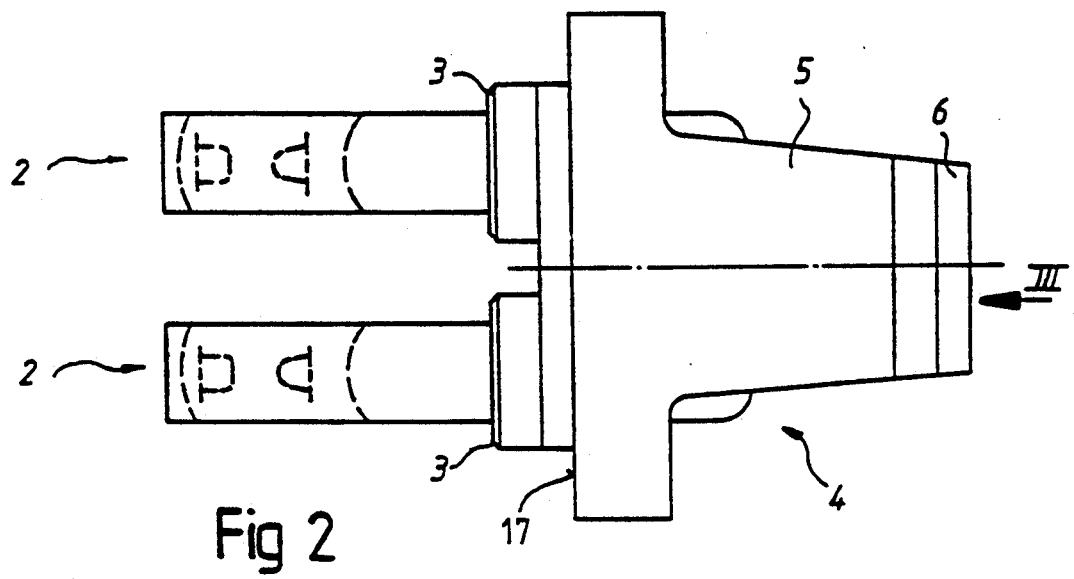
FIG. 2 shows a plan view of the switch module according to FIG. 1.
Figure 3:
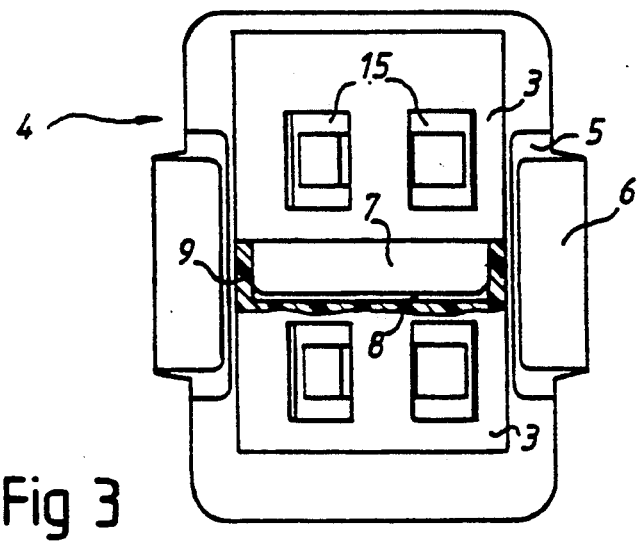
FIG. 3 shows a rear view of the switch module according to FIG. 2 in the direction of the arrow III.

The switch module shown in FIGS. 1 to 3 comprises two switches, 2 with originally one own switch base 3 each and a common module base 4. Molded onto the base 4 on both sides is a claw 5 having an enlargement 6 located at the end. The common base 4 has been created by encapsulating the individual bases 3 in a plastic and combines the switches 2 to form a switch module.

Figure 4:
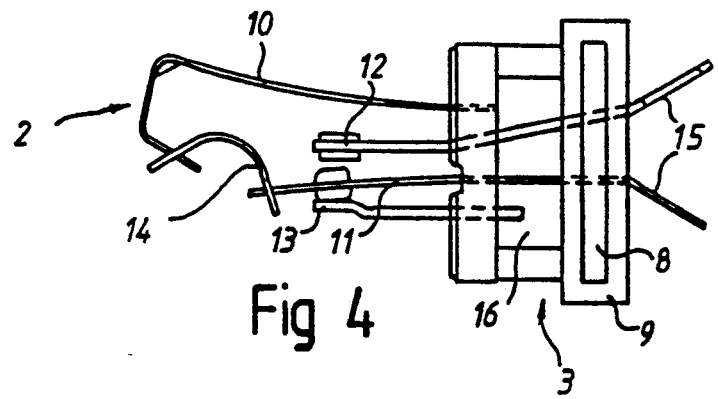
FIG. 4 shows a side view of an individual switch.

The bases 3 of the switches 2 (FIGS. 4 and 5) have on each of the opposite sides a tongue 7 and a groove 8. The groove 8 is designed in this case in such a way that it is laterally terminated in each case by a ridge 9, which represents the limitation for the tongue 7 to be introduced.

The switches 2 arranged in the switch module lie each with a spring lever 10 on a common contact plane. The respective individual base 3 encloses the spring lever 10, a switching tongue 11, a switching contact 12 and a bearing contact 13. Arranged between the spring lever 10 and the switching tongue 11 is a scroll spring 14. The ends of the switching contact 12 and of the switching tongue 11 project as soldering lugs 15 to the rear beyond the individual base 3.

As FIG. 1 shows, all the spring levers 10 of the switching module are located one behind the other on the same contact plane. This is important in order that the spring levers 10 bear simultaneously against an actuator (not shown), and consequently no switching differentials occur during operation.

The switch module shown in FIG. 2 clearly illustrates the parallel position of the individual contacts and indicates a possible installation position in a housing (not shown in greater detail). In this case, a sealing surface 17, designed as a shoulder running all around, serves for receiving a flat gasket or a sealing cap. The mold parting is designed in such a way that no parting line and consequently no flash extends over the sealing surface 17. The individual switch shown in FIG. 4 has a break-through or aperture 16, into which the forced-in plastic can later run and consequently form an inseparable bond of all the switches 2 with one another.

Figure 5:
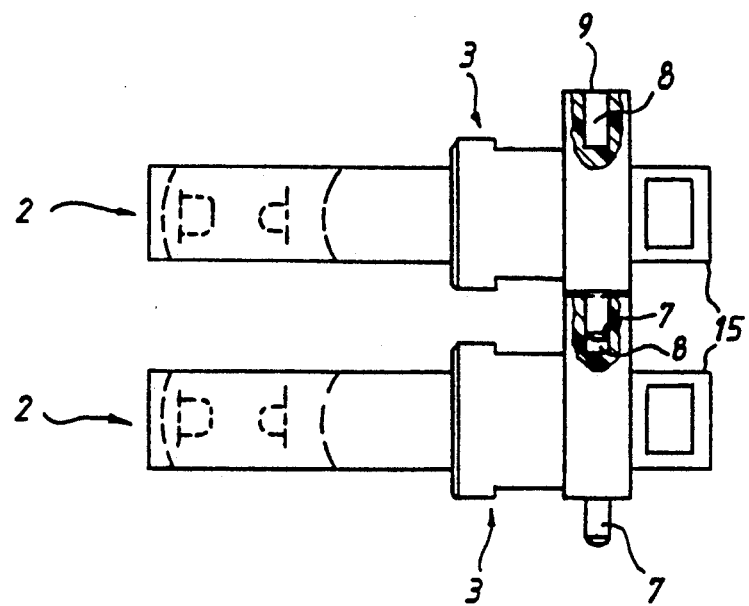
FIG. 5 shows a plan view of two plugged-together individual switches and FIG. 6 shows a rear view of the plugged-together individual switches according to FIG. 5.
Figure 6:
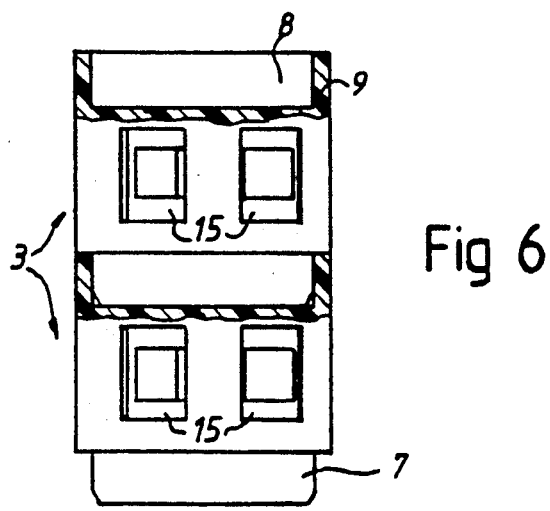

FIG. 5 shows both individual switches in the plugged-together state of the bases. This switch unit, prefabricated in this way, is then surrounded in an injection-molding device, which opens and closes in the longitudinal direction, by the same plastic as that of which the individual bases 3 consist. In FIG. 6, the representation of the individual bases 3, plugged one into the other, can be seen once again. In the same way, modules having three, four, five or more switches can also be produced. It becomes clear hereby that the lateral limitation of the tongues 7 in the grooves 8 ensures an exact position of the individual switches in the injection device and consequently has a significant influence on the correct position of all the switches during the injection operation.

What is claimed is:

1. A switch module comprising
   (a) a plurality of electric switches; each said switch including
      (1) a switch base;
      (2) interengaging connecting means mounted on each said switch base for coupling together adjoining switches in a side-by-side relationship in a single plane;
      (3) switching contacts secured to said switch base; and
   (b) a common module base encapsulating the switch bases in said side-by-side relationship; said module base being a plastic component injection-molded about said switch bases for immobilizing therein said switch bases for forming an inseparable bond between said switch bases.

2. The switch module as defined in claim 1, wherein said interengaging connecting means comprises a groove provided in an external face of a first of said switch bases and a tongue provided on an external face of a second of said switch bases; said first and second switch bases adjoining one another in a side-by-side relationship and said tongue being received in said groove; said faces of said first and second switch bases have a length extending along the entire first and second switch bases, respectively; said groove and said tongue extending substantially along the entire length of the respective faces of said first and second switch bases.

3. The switch module as defined in claim 1, wherein said module base has a mounting member formed thereon and extending therefrom.

4. The switch module as defined in claim 3, wherein said module base has two opposite sides and further wherein said mounting arrangement includes a separate claw formed on each said side; each said claw has a leg portion extending from the respective said side and a free end formed as an enlargement.

5. The switch module as defined in claim 1, wherein each said switch base has an aperture filled with the injection-molded plastic of said module base.

6. The switch module as defined in claim 1, wherein said module base has a smooth, continuous sealing surface surrounding said switch bases and having a plane intersecting said switch bases.

7. A switch module comprising
   (a) a plurality of electric switches; each said switch including
      (1) a switch base;
      (2) interengaging connecting means mounted on each said switch base for coupling together adjoining switches in a side-by-side relationship in a single plane;
      (3) switching contacts secured to said switch base; and
   (b) a common module base encapsulating the switch bases in said side-by-side relationship; said module base being a plastic component injection-molded about said switch bases for immobilizing therein said switch bases for forming an inseparable bond between said switch bases; said switch bases and said module base are made of like plastic material.

* * * * *